United States Patent [19]

Uebel

[11] Patent Number: 4,550,444
[45] Date of Patent: Oct. 29, 1985

[54] FACILITY FOR INTERMITTENT TRANSMISSION OF INFORMATION BETWEEN GUIDEWAY WAYSIDE EQUIPMENT AND VEHICLES MOVING ALONG THE GUIDEWAY

[75] Inventor: Helmut Uebel, Leonberg, Fed. Rep. of Germany

[73] Assignee: International Standard Electric Corporation, New York, N.Y.

[21] Appl. No.: 543,562

[22] Filed: Oct. 19, 1983

Related U.S. Application Data

[63] Continuation-in-part of Ser. No. 311,212, Oct. 14, 1981, abandoned.

[30] Foreign Application Priority Data

Oct. 24, 1980 [DE] Fed. Rep. of Germany ....... 3040137

[51] Int. Cl.[4] .......................... H04B 5/00; H04B 1/59
[52] U.S. Cl. ........................................ 455/41; 179/82;
246/63 A; 246/167 R; 246/187 B; 340/825.54;
343/6.5 SS; 343/6.8 R
[58] Field of Search .............................. 455/41, 54–56,
455/68, 343, 70; 246/63 A, 167 R, 187 B, 2 S, 2
F; 343/6.8 R, 6.5 R, 6.5 SS; 340/825.54; 179/82

[56] References Cited

U.S. PATENT DOCUMENTS

| 3,125,753 | 3/1964 | Jones ..................................... 455/41 |
| 3,206,728 | 9/1965 | Baumgart ........................ 343/6.8 R |
| 3,290,675 | 12/1966 | Neild .................................... 246/2 S |
| 3,609,349 | 9/1971 | Brinker .............................. 246/63 A |

Primary Examiner—Marc E. Bookbinder
Attorney, Agent, or Firm—John T. O'Halloran; Peter R. Ruzek

[57] ABSTRACT

A facility is disclosed comprising an on-board interrogator and a passive trackside transponder which transmits data messages to the interrogator on a single FM channel using, for instance, frequency shift techniques and draws the necessary transmitting energy from an alternating magnetic field produced by the interrogator. The antenna of the interrogator and the transponder are ferrite-rod antennas which are enclosed in housings similar to that used in inductive signalling equipment. The magnetic interaction between the active portion and the passive portion of the facility is used to locate faulty passive transponders.

7 Claims, 4 Drawing Figures

FACILITY FOR INTERMITTENT TRANSMISSION OF INFORMATION BETWEEN GUIDEWAY WAYSIDE EQUIPMENT AND VEHICLES MOVING ALONG THE GUIDEWAY

CROSS-REFERENCE TO RELATED APPLICATIONS

The present invention is a continuation-in-part of application Ser. No. 311,212, filed Oct. 14, 1981, now abandoned.

BACKGROUND OF THE INVENTION

The present invention relates to an automatic train control system of the type disclosed in U.S. Pat. Nos. 4,015,804; 4,023,753 and 4,266,273, all assigned to the same assignee as the present invention, whose disclosures are incorporated herein by reference, and more particularly to a facility for intermittent inductive transmission of information between guideway equipment and vehicles moving along the guideway with the energy to power the wayside equipment being supplied from this vehicle.

Such a facility is disclosed, for example, in an article by R. Beyersdorff, "Automatisches Lesen von Kennungen fur Guterwagen", Siemens Zeitschrift, November 1963, No. 11. In that prior facility, freight car numbers are transmitted from passive transponders to a trackside interrogator by means of a multifrequency code. A number of frequency generators in the transponder, which operate as frequency dividers, are activated alternately by different interrogation frequencies in accordance with the coded car number to be transmitted, and transmit simple fractions of a carrier frequency received from the interrogator back to the latter. Before being transmitted back, the signals are amplified in a transmitter amplifier. The necessary energy (DC power) is obtained by converting part of the carrier frequency received from the interrogator.

This facility is capable of transmitting 10-digit freight-car numbers to an interrogator if the speed of the cars does not exceed 100 km/h (kilometer per hour).

For transmitting information in the opposite direction, i.e., from the wayside equipment to the vehicles moving along the guideway, quite a number of other inductive facilities have been provided.

German Patent DE-AS No. 2,528,346, for example, describes a facility which uses the reaction of passive resonant circuits tuned to different frequencies on AC-powered resonant circuits of the same resonance frequency to transmit an n-out-of-m code.

While the first-described prior art facility is too slow for the speeds required in present-day transport systems and can transmit only a small amount of information, the facility described in German Patent DE-AS No. 2,528,346 is expensive and susceptible to trouble because of the many analog devices. In addition, any changes to be made in the information to be transmitted necessitates taking action in the trackside (wayside) equipment and involves alignment work. Another disadvantage lies in the use of many different frequencies.

SUMMARY OF THE INVENTION

An object of the present invention is to provide a facility that permits an amount of data sufficient for controlling vehicles to be transmitted to a vehicle travelling at speeds of up to 300 km/h on fail-safe principles using simple components which have been proven in railway signalling systems.

A feature of the present invention is the provision of a facility for intermittent inductive transmission of information between a guideway and vehicles moving along the guideway comprising: a wayside portion adjacent the guideway including a data transmitter and an energy receiver; and a vehicle-carried portion including a data receiver to receive data from the data transmitter on a predetermined frequency channel, the data being in serial binary form frequency modulated on the predetermined frequency channel, the frequency modulation on the predetermined frequency channel including a first frequency for a binary "1" and a second frequency shifted with respect to the first frequency for a binary "0", the vehicle-carried portion further including an energy transmitter to transmit energy to the energy receiver when the vehicle-carried portions approach the wayside portion, the data transmitter transmitting the data to the data receiver when the distance between the two portions becomes smaller than a predetermined critical distance, the energy received by the energy receiver being used at least in part to power the data transmitter.

Compared with the prior art facilities, the use of frequency shift techniques for data transmission simplifies the data-transmitting and data-receiving portions considerably. Both for data transmission and for energy transmission, components can be used which have been proven efficient in inductive signalling equipment, such as track magnets, or in continuous automatic train control equipment, such as the components necessary for serial transmission of data over an FM (frequency modulation) channel. In the facility according to the present invention, the reaction of the energy receiver on the energy transmitter can be evaluated like in an inductive signalling system and used to locate faulty data-transmitting parts.

In the facility according to the present invention, ferrite-rod antennas are provided both for energy transmission and for data transmission. For energy transmission, the ferrite-rod antennas commonly used for inductive train protection may be employed. The crossed arrangement of the ferrite-rod antennas used for energy transmission and those used for data transmission minimizes the interaction between the two magnetic fields. Above all, magnetic saturation of the data-transmitting ferrite-rod antennas under the action of the strong magnetic field necessary for energy transmission is avoided.

The division of the data-transmitting and data-receiving antennas into parts arranged one behind the other in the direction of travel results in a considerable extension of the guideway section along which data transmission takes place. With such a facility, three complete 44-bit data messages ("data telegrams") can be transmitted with vehicles travelling at speeds of up to 300 km/h.

The antenna housing for the antenna systems of the present invention is similar to the proven housing used in inductive signalling equipment.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
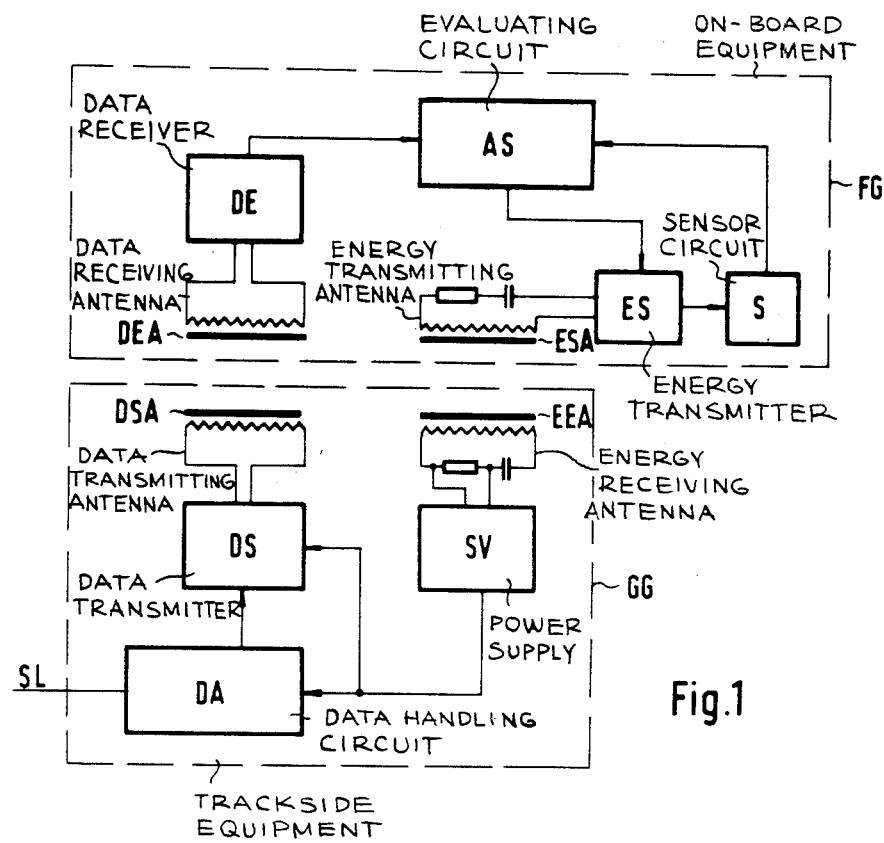
FIG. 1 is a block diagram of an intermittent inductive transmitting facility in accordance with the principles of the present invention.

FIG. 1 shows a facility according to the present invention comprising an information-delivering portion which is located adjacent to a railway track, for example, and will hereinafter be referred to as "trackside equipment GG", and a vehicle-mounted, information-receiving portion, hereinafter referred to as "on-board equipment FG". The trackside equipment GG contains a data-handling circuit DA, preferably a microcomputer system with a data memory, which makes the information available in the form of a binary data message. A data transmitter DS delivers in a single FM channel this data message via a data-transmitting antenna DSA to the on-board equipment FG. The data message is transmitted in the FM channel by employing a first frequency to indicate a binary "1" and a second frequency shifted or spaced with respect to the first frequency to indicate a binary "0". Power is supplied to the data-handling circuit DA and the data transmitter DS from a power supply SV, which rectifies the AC voltage received via an energy-receiving antenna EEA and limits the DC voltage obtained to a predetermined value. The power supply contains a storage capacitor (not shown) which maintains the supply of power to the data-transmitting and data-handling circuits DA and DS for a certain time after the power received by the energy-receiving antenna EEA has decreased. The delivery of data messages begins automatically as soon as a given supply voltage is provided by the power supply SV, and continues until the supply voltage falls below a predetermined value. Via a connection SL, the stored information to be transmitted may be changed, e.g., in accordance with a signal aspect or in accordance with an instruction entered at an interlocking station.

The on-board equipment FG contains a data receiver DE which receives the data message in the form of the frequency shift signal transmitted by the trackside equipment GG via a data-receiving antenna DEA and demodulates it, and a generator, such as an energy transmitter ES, which excites a series resonant circuit tuned to a single frequency other than the data transmission frequencies. An energy-transmitting antenna ESA is the inductance of this series resonant circuit and produces a strong alternating magnetic field in its environment. The energy transmitter ES is supplied with voltage from the vehicle's on-board supply system via a regulator (not shown) in such a way that the current flowing in the transmitting resonant circuit is maintained at a constant value. As the vehicle approaches a trackside equipment, the energy-transmitter resonant circuit is damped by the reaction of the energy-receiving resonant circuit. However, the decrease of current normally expected in the transmitting resonant circuit does not take place since the regulator counteracts such a decrease by raising the supply voltage for the energy transmitter ES and ensures that, despite the energy loss caused by the energy-receiving antenna, the electric field is maintained at the same strength, so that the supply of power to the trackside equipment is maintained. In the absence of a decrease of current, the reaction, an increase in voltage, on the energy-transmitting resonant circuit, which reaction signals to the on-board equipment the presence of a trackside equipment even if the data transmitter of the latter has failed, is now detected by a sensor circuit S, which senses the overvoltage or voltage increase across the transmitting resonant circuit. Sensor circuit S is a simple threshold switch and operates when the voltage across the transmitting resonant circuit increases above a given predetermined value determined by the system parameters. An evaluating circuit AS, such as a microcomputer or microcomputers as disclosed in the above-cited U.S. patents, decodes the data messages provided by the data receiver DE, and evaluates the signals or output of the sensor circuit to detect when the predetermined value therein has been exceeded. Circuit AS provides control signals to the cab or directly to the vehicle's automatic propulsion and braking controller. The evaluating circuit AS may also provide turn-on and turn-off signals for the energy transmitter ES, so that the latter can be turned on only in the immediate vicinity of a trackside equipment GG, for example. The turn-on position can be determined in the known manner by transmitting to the on-board equipment a distance to the next trackside equipment and performing a distance measurement by a distance meter (not shown) carried by all automatically controlled vehicles, such as disclosed in the above-cited U.S. patents and, in particular, U.S. Pat. No. 4,266,273. The microcomputer of evaluation circuit AS compares the distance measured by the distance meter from the last trackside equipment with the communicated distance and, if these two distances are equal or approximately equal, turns on energy transmitter ES. Of course, it is also possible to have the energy transmitter turned on at all times.

Figure 2A:
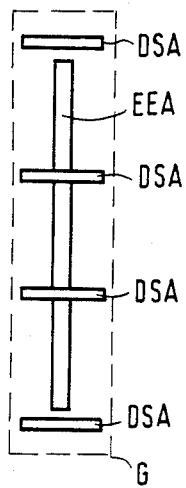
FIG. 2a is a top view of the arrangement of the transmitting and receiving antennas of the trackside equipment.

FIG. 2a shows the antenna arrangement of trackside equipment GG. The energy-receiving antenna EEA extends parallel to the direction of travel. Arranged at right angles thereto are four data-transmitting antennas DSA, which are electrically connected in series and act like a single antenna. The whole arrangement is enclosed in a hermetically sealed housing G having five sides made of highly conductive material and one side made of insulating material.

Figure 2B:
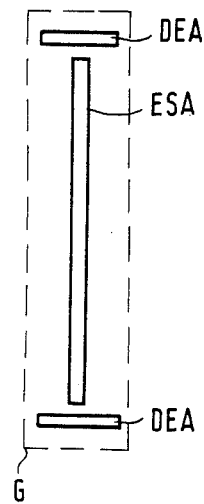
FIG. 2b is a top view of the arrangement of the transmitting and receiving antennas of the vehicle-mounted equipment.

FIG. 2b shows the antenna arrangement of on-board equipment FG. The housing G, which resembles that of trackside equipment GG, contains the energy-transmitting antenna ESA, mounted parallel to the direction of travel, and two data-receiving antennas DEA, which are electrically connected in series. The two housings are so mounted on the vehicle and in the track, respectively, that their insulating sides face each other and, when a vehicle passes a trackside equipment GG, move past each other spaced a distance of less than 200 mm (millimeter).

Figure 3:
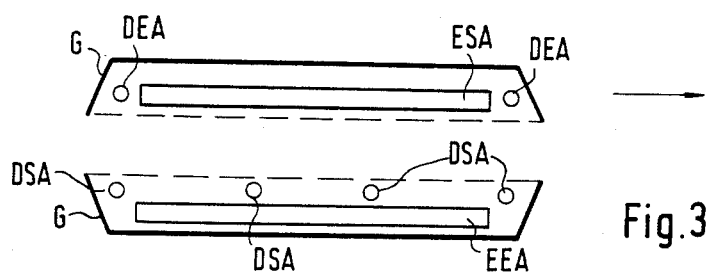
FIG. 3 shows the arrangement of the transmitting and receiving antennas in housings of both the trackside equipment and the vehicle-mounted equipment in an operative relationship with each other.

FIG. 3 shows the two antenna arrangements in the most favorable position for transmission. The antenna of the on-board equipment FG, located in the top part of FIG. 3 is moving over the antenna of the trackside equipment GG in the direction of the arrow from left to right. First the right-hand ferrite rod of the data-receiving antenna DEA moves into the range of the data-transmitting antenna DSA of the trackside equipment. However, no data transmission takes place yet, because the data transmitter is not yet being supplied with power. As the vehicle moves on to the right, the coupling between the energy-transmitting antenna ESA and the energy-receiving antenna EEA is improved, and the voltage provided by the power supply SV reaches the threshold value necessary for the start of data transmission. A threshold switch (not shown) activates the data transmitter. The data message stored in the data-handling circuit DA is then delivered and repeated until the supply voltage falls below a predetermined threshold value again. Due to the storage effect of the storage capacitor connected to the power supply, however, this is not the case until the coupling between the energy antennas ESA and EEA no longer exists. Data transmission thus continues even if only the rightmost rod of the data-transmitting antenna DSA is coupled with the left-hand rod of the data-receiving antenna DEA. This prolongs the time available for data transmission considerably, and makes it possible to safely transmit as many as three complete data messages, containing all information necessary for vehicle control, even if the vehicle is travelling at high speed.

While I have described above the principles of my invention in connection with specific apparatus it is to be clearly understood that this description is made only by way of example and not as a limitation to the scope of my invention as set forth in the objects thereof and in the accompanying claims.

I claim:

1. A facility for intermittent inductive transmission of information between a guideway and vehicles moving along said guideway comprising:
    a wayside portion adjacent said guideway including a binary data transmitter and an energy receiver having a first single series resonant circuit tuned to a first freqency coupled thereto, said first resonant circuit including an energy receiving antenna; and
    a vehicle carried portion including a binary data receiver to receive data from said data transmitter on only a single predetermined frequency modulated channel, said data being in serial binary form frequency modulated on said predetermined frequency modulated channel, said predetermined channel having a second frequency different than said first frequency representing a binary "1" and a third frequency spaced from said first and second frequencies representing a binary "0" to convey said data therein, said vehicle-carried portion further including an energy transmitter having a second single series resonant circuit tuned to said first frequency coupled thereto, said second resonant circuit including an energy transmitting antenna to transmit energy to said energy receiving antenna when said vehicle-carried portion approaches said wayside portion, said energy transmitter maintaining a current in said transmitter antenna coupled thereto at a constant value, said vehicle-carried portion further including a threshold sensor circuit having a predetermined threshold value, said sensor circuit being coupled to said energy transmitter and sensing any voltage across said energy transmitting antenna in excess of said threshold value when said energy receiving antenna reacts with said energy transmitting antenna to cause said energy transmitter to transmit sufficient energy to power said data transmitter, said data transmitter transmitting said data to said data receiver when the distance between said two portions becomes smaller than a predetermined critical distance, said energy received by said energy receiving antenna being used at least in part to power said data transmitter.

2. A facility for intermittent inductive transmission of information between a guideway and vehicles moving along said guideway, comprising:
    a wayside portion adjacent said guideway including a binary data transmitter and an energy receiver having a first single series resonant circuit tuned to a first frequency coupled thereto, said first resonant circuit including an energy receiving antenna, said wayside portion further including a data transmitting antenna coupled to said data transmitter; and
    a vehicle carried portion including a binary data receiver to receive data from said data transmitter on only a single predetermined frequency modulated channel, said data being in serial binary form frequency modulated on said predetermined frequency modulated channel, said predetermined channel having a second frequency different than said first frequency representing a binary "1" and a third frequency spaced from said first and second frequencies representing a binary "0" to convey said data therein, said vehicle-carried portion further including an energy transmitter having a second single series resonant circuit tuned to said first frequency coupled thereto, said second resonant circuit including an energy transmitting antenna to transmit energy to said energy receiving antenna when said vehicle-carried portion approaches said wayside portion, said data transmitter transmitting said data to said data receiver when the distance between said two portions becomes smaller than a predetermined critical distance, said energy received by said energy receiving antenna being used at least in part to power said data transmitter, said vehicle-carried portion further including a data receiving antenna coupled to said data receiver, said data transmitting antenna and said energy transmitting antenna each being a ferrite-rod antenna disposed at right angles to one another, said data receiving antenna being a ferrite-rod antenna and said energy transmitting antenna being disposed at right angles to said data receiving antenna.

3. A facility according to claim 2, wherein
said energy receiving antenna is a ferrite-rod antenna; and wherein
said ferrite-rod energy transmitting antenna and said ferrite-rod energy receiving antenna each includes at least one ferrite rod disposed parallel to said guideway.

4. A facility according to claim 3, wherein
said ferrite-rod data transmitting antenna includes a plurality of ferrite rods electrically connected in series, each having their longitudinal axis disposed perpendicular to said guideway and disposed one behind the other in a predetermined space relationship.

5. A facility according to claim 4, wherein
said ferrite-rod data receiving antenna includes two ferrite rods electrically connected in series, each having their longitudinal axis disposed perpendicular to said guideway and disposed one behind the other in a predetermined spaced relationship.

6. A facility according to claim 5, wherein
said data receiving antenna and said energy transmitting antenna is disposed in a first housing, and said data transmitting antenna and said energy receiving antenna is disposed in a second housing in a cooperative relationship with said first housing, each of said first and second housings having highly conductive material on five sides thereof and an insulating material on a sixth side thereof, said sixth side of each of said first and second housings facing one another.

7. A facility according to claim 2, wherein said data receiving antenna and said energy transmitting antenna are disposed in a first housing, and said data transmitting antenna and said energy receiving antenna are disposed in a second housing in a cooperative relationship with said first housing, each of said first and second housings having highly conductive material on five sides thereof and an insulating material on a sixth side thereof, said sixth side of each of said first and second housings facing one another.

* * * * *